US 6,717,046 B2

(12) United States Patent
Yanagisawa

(10) Patent No.: US 6,717,046 B2
(45) Date of Patent: Apr. 6, 2004

(54) COMPUTER DEVICE, ELECTRIC DEVICE, HOUSING AND COVER

(75) Inventor: Takashi Yanagisawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/118,749

(22) Filed: Apr. 9, 2002

(65) Prior Publication Data
US 2003/0002247 A1 Jan. 2, 2003

(30) Foreign Application Priority Data
Apr. 27, 2001 (JP) ........................................ 2001-133511

(51) Int. Cl.$^7$ ................................................ H05K 5/06

(52) U.S. Cl. .................................. 174/17 VA; 174/15.1; 174/16.2; 174/93; 174/38; 174/100; 174/65 G; 174/77 R; 174/37; 361/716; 361/704; 361/721; 361/720; 361/699; 361/688; 361/687

(58) Field of Search ............................ 174/17 VA, 15.1, 174/16.2, 93, 38, 100, 65 G, 16.1, 77 R, 37; 361/716, 704, 721, 720, 699, 688, 687

(56) References Cited

U.S. PATENT DOCUMENTS

| 3,973,477 | A | * | 8/1976 | Jakob et al. ................. 454/184 |
| 5,246,573 | A | * | 9/1993 | Lodholz et al. ............. 210/159 |
| 5,406,314 | A | * | 4/1995 | Kuehnle ..................... 347/115 |
| 5,623,390 | A | * | 4/1997 | Noda et al. .................. 361/679 |
| 5,649,859 | A | * | 7/1997 | Shiga ......................... 454/275 |
| 5,665,146 | A | * | 9/1997 | Mizobe .......................... 96/7 |
| 6,033,800 | A | * | 3/2000 | Ichiyanagi et al. ......... 429/176 |

* cited by examiner

Primary Examiner—Dean A. Reichard
Assistant Examiner—Anton Harris
(74) Attorney, Agent, or Firm—Carlos Munoz-Bustamante

(57) ABSTRACT

To provide a computer device wherein liquid penetration into a ventilation hole from its periphery can be prevented or reduced without sacrificing design and without limitation of the size and operation.

Coating films 7a and 7b in frame form are applied on a periphery of a ventilation hole 6. A wet-characteristic of the coating film 7a and 7b is different from a wet-characteristic of material composing a housing 3. For example, when an angle of contact of coating films 7a and 7b for water is larger than an angle of contact of material composing the housing 3, if water is spilled on the outside of the coating film 7b the coating film 7b prevents the water flow into the ventilation hole 6.

14 Claims, 5 Drawing Sheets

COMPUTER DEVICE, ELECTRIC DEVICE, HOUSING AND COVER

DETAILED DESCRIPTION OF THE INVENTION

1. Field of the Invention

The present invention relates to an electric device such as a personal computer (PC), for which liquid penetration into its inside is not desired, and particularly relates to a technique for preventing or reducing liquid penetration into the electric device.

2. Background Art

An electric device such as PC has as its components, electric/electronic parts responsible for functions of the electric device, and a housing (or cover) for accommodating the electric/electronic parts. As well known, water should be avoided for the electric/electronic parts. Therefore, it is desired that the inside of the housing for accommodating the electric/electronic parts is completely sealed from the outside. However, for some electric devices, the inside of the housing cannot be sealed completely in terms of function, and holes through which the inside of the housing communicates with the outside may be formed. In the case where a fan is provided inside the housing, for example, a through-hole referred to as ventilation hole or exhaust hole (referred to as ventilation hole hereafter) is formed into the housing. It is obvious that the ventilation hole cannot be sealed. Accordingly, it is assumed that liquid may penetrate inside through the ventilation hole.

PROBLEMS TO BE SOLVED BY THE INVENTION

For example, Published Unexamined Patent Application No. 8-203365 specification discloses a communication device that is subject to dampproofing treatment. The communication device has an arrangement wherein a water absorbing sheet is attached onto a back inner surface of the device body with ventilation holes formed therein and a waterproof sheet preventing water penetration but allowing air ventilation through the ventilation holes. As the communication device disclosed in the Published Unexamined Patent Application No. 8-203365 specification, an arrangement in which a waterproof sheet preventing water penetration but allowing air ventilation through a ventilation hole is attached may be employed, if the arrangement is for a level where a ventilation hole only needs to allow air ventilation. However, such a waterproof sheet does not have adequate ventilation capability required for the case where a fan is operated, because of its high density. In other words, there is a case where it is difficult to employ the waterproof sheet preventing water penetration but allowing air ventilation for the ventilation hole for the fan.

For example, there is a case where a user using a notebook PC carelessly spills coffee he/she drinks over the PC. The coffee spilled onto the periphery of a ventilation hole may penetrate through the ventilation hole. It is expected to prevent such liquid penetration such as coffee by forming a three-dimension barrier around the ventilation hole. However, since in order to prevent liquid penetration through the ventilation hole the required height of the three-dimension barrier is several millimeters, the design of the notebook PC is sacrificed. There are some cases where provision of such three-dimension barrier should be avoided in the light of the size or operation of the notebook PC.

Therefore, it is an object of the present invention to provide a computer device and electric device wherein liquid penetration through a ventilation hole from its periphery is prevented or reduced without sacrificing the design and limiting the size and operation. It is also an object of the present invention to provide a housing or cover suitable for such an electric device.

SUMMARY OF THE INVENTION

There is large attention to material with water-repellency or hydrophilicity these days. For example, it is known to apply water repellent finish to a cloth to provide the cloth with waterproofness. It is also known, as disclosed in Published Unexamined Patent Application No. 2000-309068 specification, to attach hydropholic film onto a predetermined portion to provide super-hydrophilicity, anti-fogging characteristic, and antifouling characteristic.

Those skilled in the art may attempt to apply water-repelling material onto periphery of a ventilation hole formed into a notebook PC so that water of coffee or the like, when it spills on the periphery of the ventilation hole, is prevented from penetrating through the ventilation hole. They may do it because of an advantage that water-repelling material can be formed much thinner than the three-dimension barrier described above. However, water on the water-repelling material gets out from the area on the water-repelling material while the possibility of the water movement toward the ventilation hole cannot be eliminated. Thus, it is difficult to solve the problem of the present invention only by applying wet-repelling material onto the periphery of the ventilation hole. This is similar for the case where hydrophilic material is applied onto the periphery of the ventilation hole.

The inventors investigated control of flow of water to prevent or reduce its penetration through a ventilation hole typically in the case where the water is present in a part where water penetration should be avoided, typically around the ventilation hole. Liquid flow on solid's surface is largely influenced by wet-characteristic of the solid's surface. Particularly, if there are boundaries where wet-characteristic for liquid varies steeply, surface tension of liquid on the boundaries is different from the one on the other portions. Use of this property allows controlling of liquid movement. More specifically, boundaries with different wet-characteristic are formed so that the boundaries reduce liquid fluidity in a direction along which liquid penetration should be prevented. In order to form the boundaries with different wet-characteristic, materials with different wet-characteristic may be alternately arranged. This arrangement allows change in the physical dimension to be reduced extremely smaller than the case where three-dimension barrier is provided.

The present invention is a computer device based on the things described above, comprising a device body with a keyboard disposed as input means; and an display part for displaying an image corresponding to an operation for said device body, wherein a ventilation hole through which an inside of said device body communicates with an outside of said device body are formed in said device body, and wherein a liquid flow control arrangement in which a first region with a first wet-characteristic and a second region with a second wet-characteristic different from the wet-characteristic of said first region are alternately arranged is provided in said device body such that the arrangement surrounds a periphery of said ventilation hole.

Objects to which the present inventions are applied are not limited to computer devices but can be applied to a variety of electric devices. Specifically, an electric device of the present invention comprises: a housing having an exposed surface portion outside and predetermined accommodation room inside; and electric and/or electronic parts accommodated in the accommodation room in said housing, wherein said housing comprises: a ventilation hole through which said accommodation room communicates with outside of the housing; and a liquid flow control arrangement formed on a periphery of said ventilation hole of said surface portion, in which arrangement a first region with a first wet-characteristic and a second region with a second wet-characteristic different from the wet-characteristic of said first region are alternately arranged.

A computer device and an electric device of the present invention have a ventilation hole in their housings. The ventilation hole is not limited to the one required for the function of the electric device but includes the ones formed because of a design requirement. Since the ventilation hole allows communication between the accommodation room for accommodating the electric/electronic parts and the outside, there is possibility that water of coffee or the like that user spilled onto the outside penetrates through the ventilation hole into the accommodation room. However, since the computer device and electric device of the present invention have on a periphery of said ventilation hole, a liquid flow control arrangement in which a first region with a first wet-characteristic and a second region with a second wet-characteristic different from the wet-characteristic of said first region are alternately arranged, even if liquid moves on the surface portion of the housing toward the ventilation hole, the movement can be prevented by the liquid flow control arrangement. For example, even if liquid moves in the direction perpendicular to the liquid flow control arrangement, the liquid changes its movement direction perpendicularly upon reaching the liquid flow control arrangement so that liquid penetration through the ventilation hole can be prevented or reduced.

The present invention may be more advantageous depending on the location at which the ventilation hole is formed. For example, the present invention may be more advantageous in the cases where the ventilation hole is formed in a face that may contact with another member, such as a place where another member is often mounted thereon, a place that may be a bottom face by being turned, or a place where another member slides thereon. Specifically, in such cases, when level difference is formed on the periphery of the ventilation hole, another mounted member is unstable. Additionally, it is expected that mounting another member on a higher level portion causes stress concentration at the higher level place and occurrence of shearing force reacting to the weight in the periphery of the higher level portion or near a portion at which another member contacts the higher place. It is also expected that in the case of sliding of another member, smooth slide motion is not available and the frictional resistance increases. On the other hand, the present invention does not need formation of level difference that may cause such disadvantages. Specifically, the present invention provides its advantage more effectively when said ventilation hole is formed in one surface of said housing body and when said electric device is used in at least two mode: a first mode wherein with said one surface, another member having another surface contacts such that stress may occur at least region near said ventilation hole in said another surface; and a second mode wherein said one surface do not contact with said another member having said another surface.

There are different embodiments for forming the first region and second region for the electric device of the present invention. However, since the most important thing in the present invention is to reduce change in the physical dimension to extremely small one, it is desired to form the first region and second region in view of such a point. For example, the liquid flow control arrangement can be formed by attaching film with a first wet-characteristic to the first region and attaching film with a second wet-characteristic to the second region. Instead of using film, an embodiment wherein coating is applied may be employed.

As described above, an embodiment wherein material itself that composes the housing is used for the first region, may be available, as well as the embodiment wherein films corresponding to the first region and second region are attached or coatings corresponding to them are applied. Specifically, in the electric device of the present invention, material composing the housing may be used for the first region, and material different from the one composing the housing may be used for the second region. In this case, since attachment of the material in a form of film corresponding to the second region, or application of coating corresponding to the second region is only required, the manufacturing of the electric device is easy and cost reduction is provided.

In description so far, forming the first region and second region of different materials is described, however, forming the first region and second region of same material is available in the present invention. Generally, wet-characteristics of same material are identical. (Wet-characteristic can be evaluated by angle of contact.) However, it is based on an assumption that the surface property is identical, and thus for example, even for same material, different surface roughness will provide different angle of contact. The present invention includes forming the first region and second region from same material by providing different surface property. The simplest approach is to form the first region and second region with different surface roughness on the periphery of said ventilation hole of the housing. Specifically, in an electric device of the present invention the first region and second region are composed of material composing the housing, and the first region and second region have different surface roughness from each other, so that the predetermined advantage of the present invention may be provided. In the case where the housing of the electric device is manufactured by plastic injection molding, surface roughness of the portions of the mold for injection molding, which portions are corresponding to the first region and second region, may be differentiated. This embodiment has an advantage in manufacturing process that after setting the surface roughness of the mold at predetermined one it is not needed to add a specific process steps to form the first region and second region.

The term "angle of contact" means the angle between the tangential fine along contacting portion of surface of a liquid drop placed on a plane and the plane, and it is also used same way in the specification of the present invention. Angle of contact depends on the type of liquid drop, and in the specification of the present invention the phrase "different angle of contact" means that angle of contact for same liquid drop is different.

In the electric device of the present invention an liquid flow control arrangement is formed on the periphery of the ventilation hole, and its location may be defined properly according to shape of the ventilation hole, forming location and so on. In the case of ventilation hole through which liquid may penetrate from all directions on the periphery of the ventilation hole, it is desirable that the liquid flow control arrangement is formed such that it surrounds the ventilation hole. However, the arrangement is not limited to the embodiment wherein it surrounds the periphery. Additionally, how long distance apart from the ventilation hole to form the liquid flow control arrangement may be properly defined depending on configuration of the ventilation hole, location of formation, and so on.

In the electric device of the present invention, the first region and second region may be formed by film attachment, application of coating or adjustment of surface roughness, as described above. Therefore, since the first region and second region can be substantially at same height level as the surface portion of the housing around the regions, liquid penetration through the ventilation hole can be prevented or reduced without sacrificing design of the electric device.

In the liquid flow control arrangement of the present invention, a first region with first wet-characteristic and a second region with second wet-characteristic different from the one of said first region are alternately arranged, and there is no limitation for the number of the arranged regions. Assuming that one set consists of the first region with the first wet-characteristic and the second region with the second wet-characteristic different from the one of said first region, essentially, the arrangement has only to have at least one set, and may also have two sets or three sets. The arrangement also includes an embodiment for "one and half" sets, that is like "the first region, the second region, and the first region".

The present invention has been described for the examples of application to electric devices. However, the present invention can be applied not only to electric devices but also generally to housings other than electric devices, for which housings liquid penetration to the inside should be prevented basically, and on which housings a flow path is inevitably formed that allows liquid penetration because of some reason. Therefore, the present invention provides a housing characterized in that the housing comprises: a housing body having predetermined accommodation room therein; a water-penetration-allowable flow path inevitably allowing water penetration into said accommodation room; and wet-characteristic varied boundaries formed in stripe form near said water-penetration-allowable flow path, in which wet-characteristic is varied.

As described above, when there are boundaries where wet-characteristic for liquid steeply changes, surface tension of the liquid on the boundaries is different from the one on the other portions, and this property allows control of the liquid flow. Thus, in the housing of the present invention, wet-characteristic varied boundaries where wet-characteristic is varied are formed in stripe form near to the water-penetration-allowable flow path. Here, the wet-characteristic varied boundaries are formed in stripe form, and it means that there is a plurality of the wet-characteristic varied boundaries near to the water-penetration allowable flow path. Therefore, the function for reducing water penetration into the water-penetration-allowable flow path is enhanced. Such wet-characteristic varied boundaries can be formed by arranging regions with different wet-characteristic adjacent to each other.

The concept of the water-penetration-allowable flow path includes the ventilation hole described above, but it is not limited to the ventilation hole and also includes generally paths inevitably allowing water penetration into the housing. Particularly, the present invention is not limited to through-holes and the present invention also effectively serves for a ventilation hole less liquid-permeable, for example the one with a filter attached thereon.

In the housing of the present invention, it is desirable that spacing between adjacent wet-characteristic varied boundaries is set in the range of 1 to 10 millimeters in order to properly control liquid flow. It is also desirable that the difference in angle of contact versus water on the regions that are partitioned by the wet-characteristic varied boundaries is 50 degrees or more because of the same reason.

In the housing according to the present invention, there is no limitation on the position where the water-penetration-allowable flow path is formed. However, the advantage of the present invention is particularly provided when the water-penetration-allowable flow path is provided on a position, at which an operator operating a device provided with the housing touches directly the hosing during operation, since it is not needed to provide the housing with level difference that obstructs the operation. Therefore, the advantage of the present invention is particularly provided when the housing of the present invention is such that the water-penetration-allowable flow path is provided on the surface of the housing of the housing body, which surface an operator touches during operation.

The present invention can be also applied to a cover composing a portion of a housing as well. Specifically, the present invention provides a cover forming an outer case of an electric device, characterized in that it comprises: a cover body having a flat face with a predetermined area; and a wet-characteristic varied region formed in said flat face and composing substantially same plane with said flat face, in which region wet-characteristic intermittently varies.

The cover of the present invention comprises a wet-characteristic varied region in which wet-characteristic intermittently varies. Because the wet-characteristic is varied intermittently, liquid changes its flow direction after flowing on the flat surface, upon reaching the wet-characteristic varied region. Accordingly, liquid penetration into an electrical device can be prevented or reduced by providing the wet-characteristic varied region on a place, into which liquid penetration should be prevented.

In the cover of the present invention, the wet-characteristic varied region can be formed by alternately arranging band regions composed of materials with angle of contact different to each other. In the cover of the present invention, the wet-characteristic varied region can be formed by providing a first band region continuously having a first angle of contact for a predetermined width, and a second band region adjacent to said first band region and continuously having a second angle of contact different from the first angle of contact for a predetermined width.

DESCRIPTION OF SYMBOLS

Figure 1:
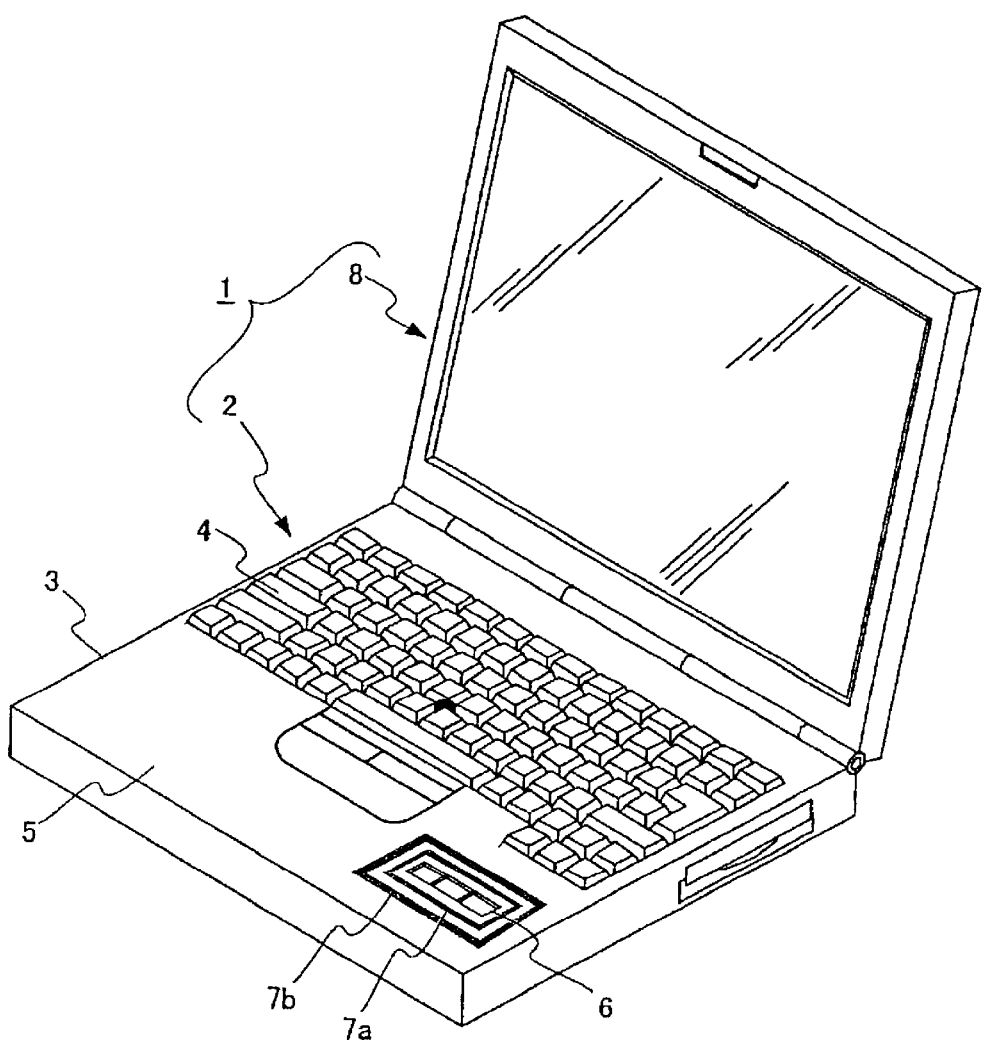
FIG. 1 is a perspective view of a notebook PC according to an embodiment of the present invention.

1 . . . Notebook PC
2 . . . PC body
3 . . . Housing
4 . . . Keyboard
5 . . . Flat face
6 . . . Ventilation hole
7, 7a, 7b . . . Coating film
8 . . . Display part

PREFERRED EMBODIMENT

The present invention will be described according to an embodiment wherein it is applied to a notebook PC 1.

The notebook PC 1 consists of a PC body 2 and a display part 8. The PC body 2 comprises a housing 3 and a keyboard disposed on the top surface of the housing 3. The housing 3, for example, composed of ABS resin, comprises accommodation room inside, which accommodates electric/electronic parts such as a CPU, a hard disc drive, a floppy disc drive, power supply means, and a cooling fan (all not shown) for PC function. The housing 3 also functions as a cover of the electric/electronic parts. A flat face 5 having predetermined area is formed on the upper surface of the housing 3 other than the keyboard 4. A ventilation hole 6, through which the accommodation room of the housing 3 communicates with the outside of the housing 3, is formed on an right edge portion of the flat face 5 as shown in the figure. The ventilation hole 6 functions as an exhaust hole for the cooling fan accommodated in the accommodation room in the housing 3. It desirable that water penetration through the ventilation hole 6 into the accommodation room is prevented. However, the ventilation hole 6 can be a water penetration path inevitably allowing water penetration since it is not possible to perfectly seal the ventilation hole 6 because of its function. Coating films 7a and 7b are formed in a form of frame around the ventilation hole 6. The coating film 7a and 7b are composed of polyethylene-based resin, and constitute with the flat face 5 of the housing 3 an liquid flow control arrangement, as described later.

The display part 8 comprises a known LCD (Liquid Crystal Display) as image display means.

Figure 2:
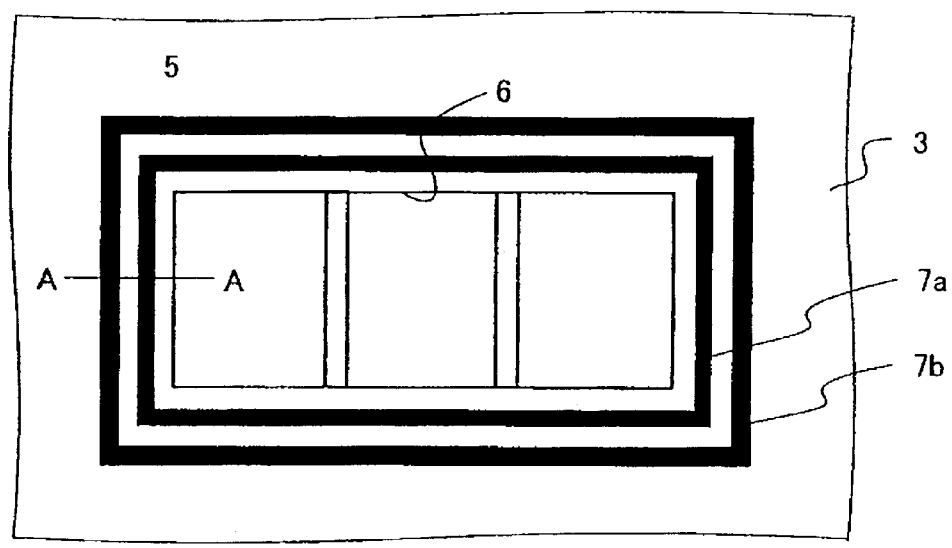
FIG. 2 is a plan view showing a vicinity of a ventilation hole of a notebook PC according to an embodiment of the present invention.

FIG. 2 is a plan view showing a vicinity of the ventilation hole 6.

As shown in FIG. 2, a band region formed from ABS resin, a band region formed from the coating 7a, a band region formed from ABS resin, and a band region formed from the coating film 7b are arranged alternately around the ventilation hole 6. The housing 3 is composed of ABS resin as described above. The coating film 7a and 7b are composed of polyethylene-based coating. ABS resin and the polyethylene-based coating have wet-characteristics that are different from each other. ABS resin has a first wet-characteristic, and the polyethylene-based coating has a second wet-characteristic, thereby providing alternating arrangement of the region with the first wet-characteristic and the region with the second wet-characteristic. The arrangement wherein the first region with the first wet-characteristic and the second region with the second wet-characteristic are alternately arranged, will be referred to as a liquid flow control arrangement. In this embodiment, the liquid flow control arrangement is formed such that it surrounds the periphery of the ventilation hole 6. ABC resin has angle of contact versus water of about 70 degrees, and polyethylene has angle of contact versus water of about 95 degrees.

Figure 3:
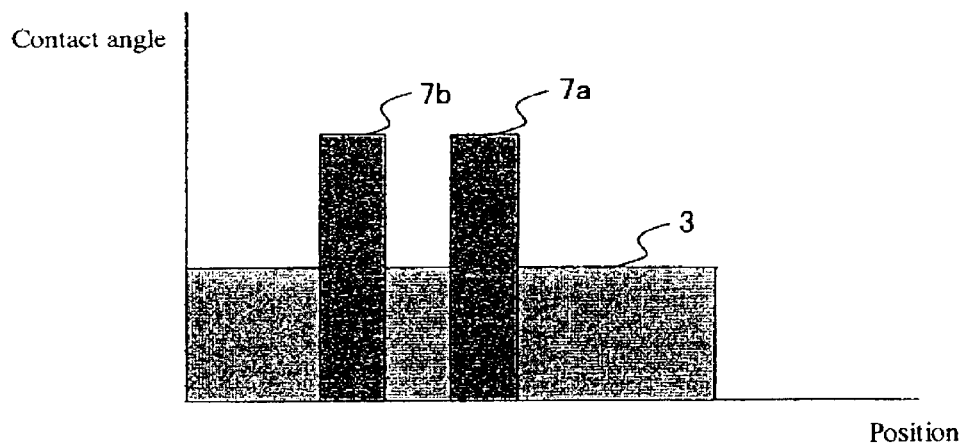
FIG. 3 is a graph showing a variation of angle of contact in A—A portion in FIG. 2.

FIG. 3 shows a distribution profile showing angle of contact in A—A portion in FIG. 2.

As shown in FIG. 3, the wet-characteristic varies intermittently, where the angle of contact on the portion corresponding to the housing 3 is small, and the angle of contact on the portion corresponding to the coating film 7a and 7b is large. The first angle of contact corresponding to the housing 3 is continuously given for a predetermined width, while the second angle of contact corresponding to the coating film 7a and 7b is continuously given for a predetermined width. There are at borders between the housing 3 and the coating 7a and 7b, wet-characteristic varied boundaries where angle of contact or wet-characteristic steeply varies. There are four wet-characteristic varied boundaries. With reference to FIG. 2, it is appreciated that the wet-characteristic varied boundaries are formed in stripe form near the ventilation hole 6 in the plan view. Experiments by the inventers shows that larger difference between the first angle of contact and second angle of contact provides better advantage of the present invention. Specifically, the advantage of the present Invention is prominent when the difference between the first angle of contact and second angle of contact versus water is 50 degrees or more particularly, 70 degrees or more.

Figure 4A:
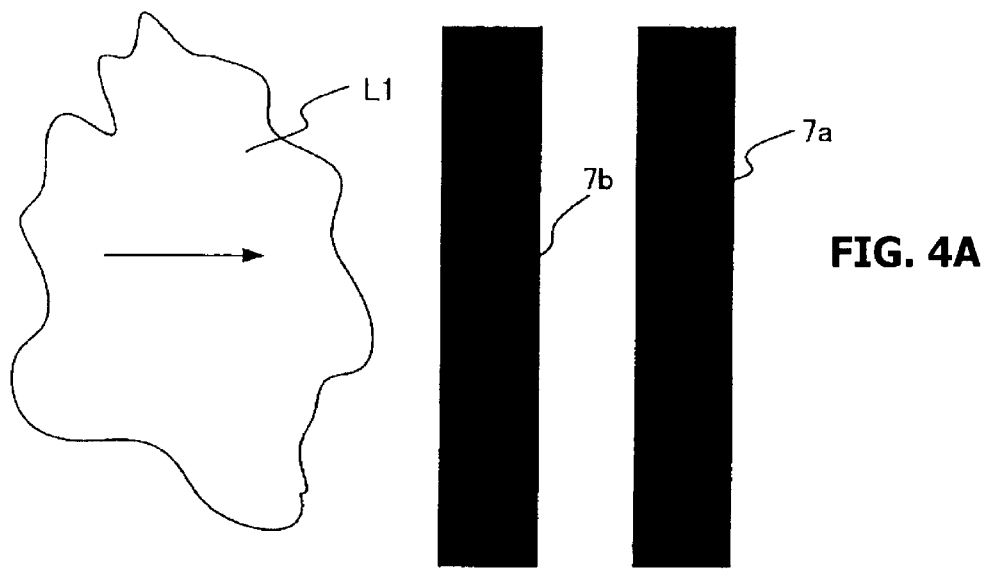
FIG. 4 illustrates liquid flow control according to an embodiment of the present invention.
Figure 4B:
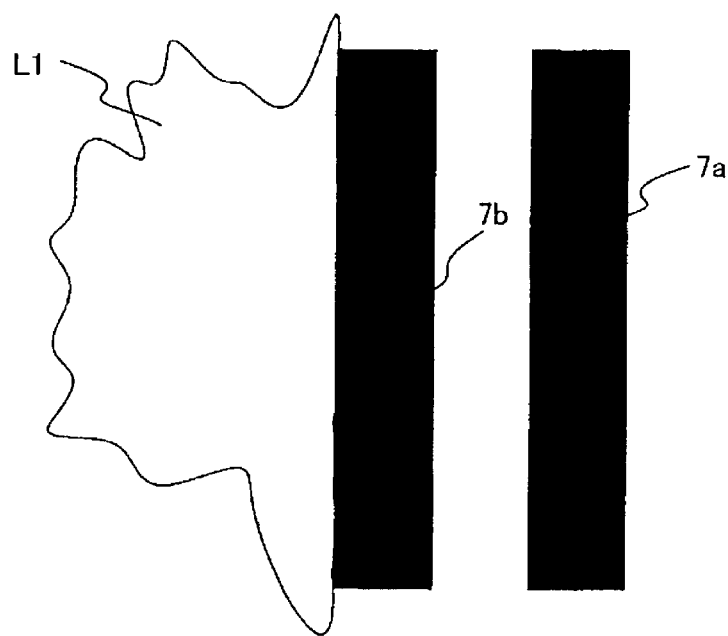

In this embodiment, since the liquid flow control arrangement is formed on the housing 3, when liquid is spilled on the periphery of the arrangement the liquid penetration into the ventilation hole 6 is prevented or reduced. Specifically, assume that liquid L1 having a high wet-characteristic for ABS resin is spilled on outside of the coating film 7b on the housing 3, as shown FIG. 4(a). The spilled liquid L1 moves in the direction of the arrow in the figure. Upon the liquid L1 reaching the coating film 7b, because of surface tension increasing at the boundaries between the housing 3 and the coating film 7b, the liquid L1 flows in longitudinal direction of the coating film 7b, as shown in FIG. 4(b). Thus, when liquid like the liquid L1 having a high wet-characteristic for the housing 3 reaches the coating film 7b, the flow direction of the liquid is controlled. If the liquid reaches the coating film 7b with high flow speed, it may pass the coating film 7b. However, the coating film 7a is provided, and the flow direction of the liquid L1 can be controlled by the coating film 7a. It is thus effective to form the wet-characteristic varied boundary in stripe form by forming the coating film 7a and 7b in multiple form so as to improve the prevention effect against liquid L1 penetration. When the liquid flow control arrangement is provided, the height level of it is substantially same as the flat face S of the housing 3, since the coating films 7a and 7b with thickness on the order of microns can provide their function. This provides the following advantages:

an operator for the notebook PC 1 does not have any wrong feeling when he/she operates the notebook PC 1 and then touch in the flat face 5 the region with the ventilation hole 6 formed therein, since the liquid flow control arrangement according to this embodiment is substantially at same height level as the flat face 5; and there is no possibility that when the display part 8 is closed the liquid flow control arrangement contacts with the display part 8, resulting in stress generation.

Figure 5A:
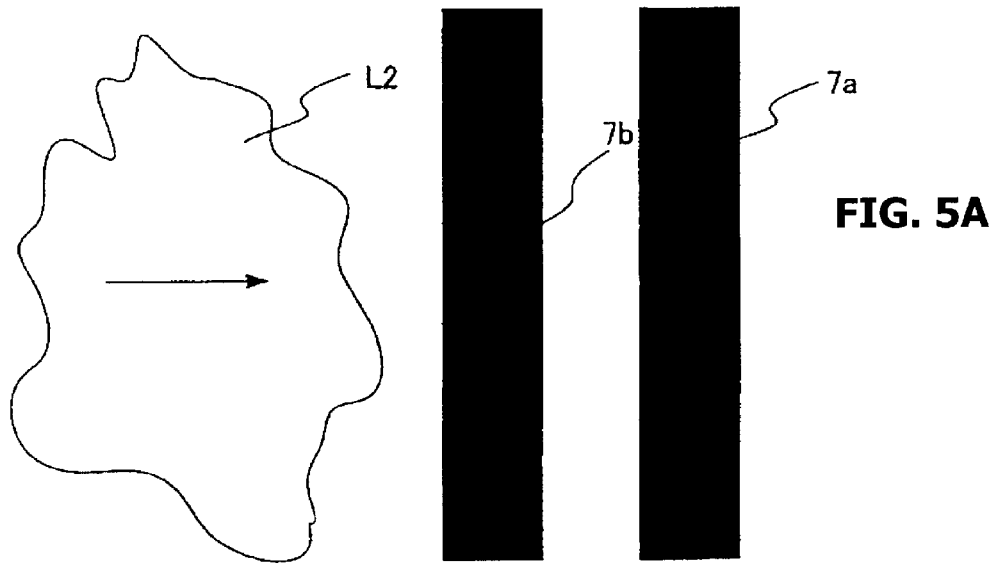
FIG. 5 illustrates liquid flow control according to an embodiment of the present invention.
Figure 5B:
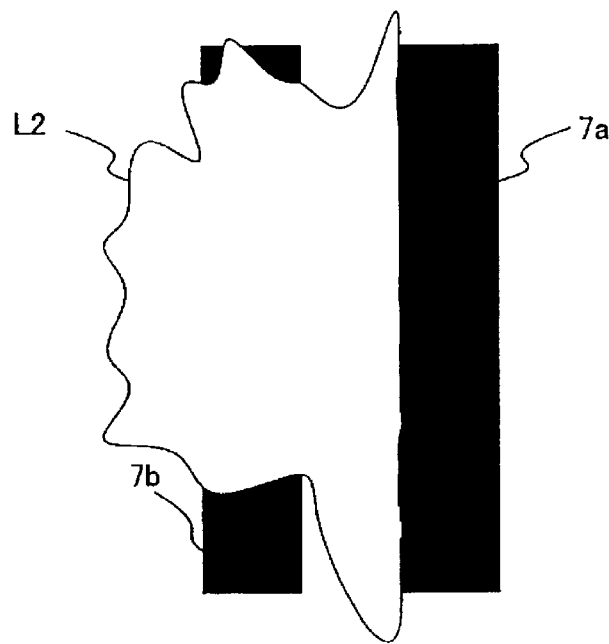

While in FIG. 4 the example has been described wherein water that has a high wet-characteristic or a small angle of contact for ABS resin composing the housing 3 is spilled, it is also possible as well to control flow of liquid having a low wet-characteristic or a large angle of contact for ABS resin when the liquid is spilled. Specifically, assume that liquid L2 having a low wet-characteristic for ABS resin is spilled on the outside of the coating film 7b on the housing 3, as shown in FIG. 5(a). The spilled liquid L2 flows in the direction of the arrow in the figure. After it has reached the coating film 7b it also flows over the coating film 7b since the coating film 7b has a high wet-characteristic for the liquid L2. However, upon reaching the ABS resin portion of the housing 3, the liquid L2 flows along the longitudinal direction of the coating film 7a, as shown in FIG. 5(b), because of increased surface tension at the border between the coating film 7a and the housing 3.

In the embodiments described above, the first region is composed of material composing the housing 3, and the second region is composed of different material from the housing 3. However, the present invention is not limited to the embodiments described above. The first and second regions may be composed of different materials from material composing the housing 3. In one of such examples, two types of coating having different angle of contact from each other may be applied in stripe form. The first and second regions may be composed of same material. This is because different surface property of same material results in different wet-characteristic. In one of such examples, films made of same material but having different surface roughness are alternately attached to the housing 3. The first and second regions may be formed of the material composing the housing 3 by varying the surface roughness on the housing 3 itself instead of attaching films.

Figure 6:
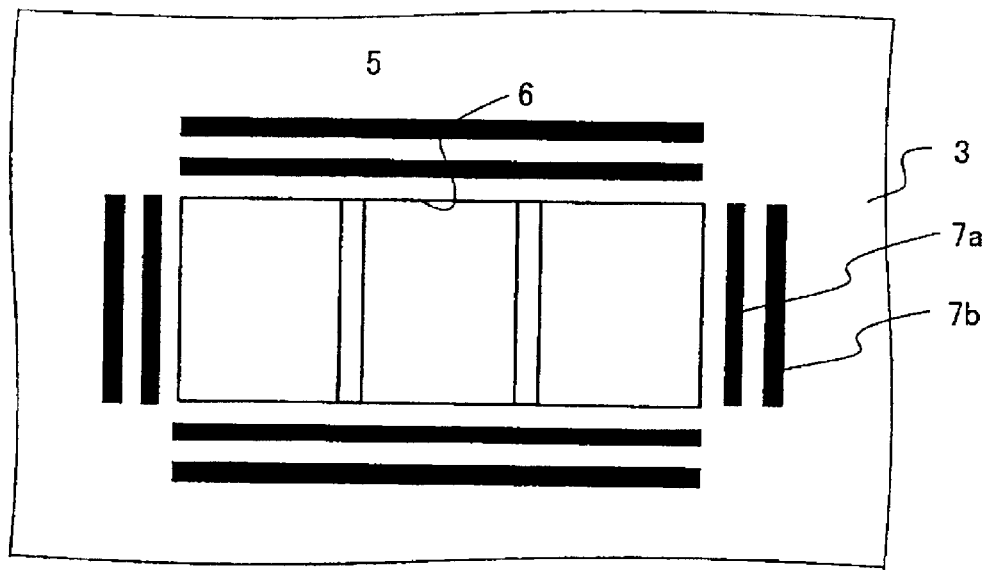
FIG. 6 shows another example for formation of coating films according to an embodiment of the present invention.
Figure 7:
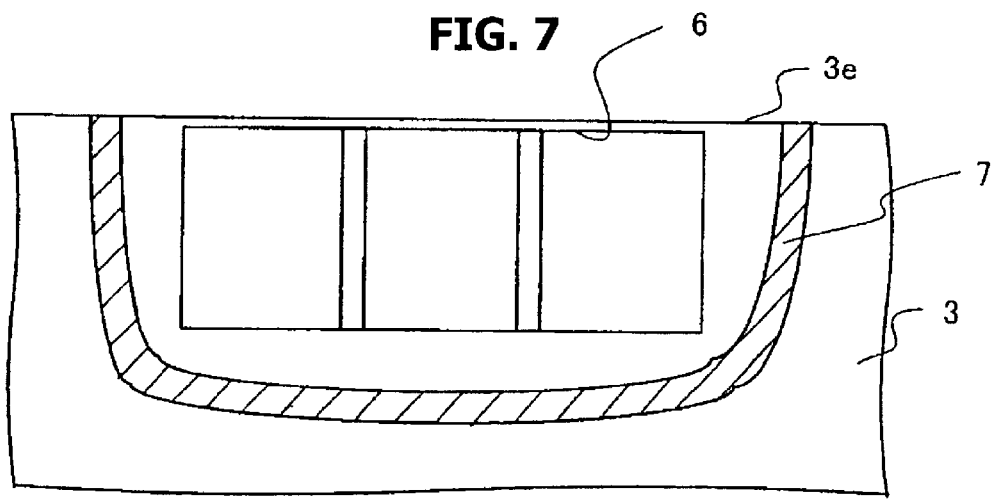
FIG. 7 shows another example for formation of coating films according to an embodiment of the present invention.

In the embodiments described above, the periphery of the ventilation hole 6 is surrounded entirely by the frame-shaped coating films 7a and 7b. However, an arrangement is available wherein intermittent coating films 7a and 7b surround the ventilation hole 6, as shown in FIG. 6. If the ventilation hole 6 is near an edge 3e of the housing 3, as shown in FIG. 7, a coating film 7 may be formed around the ventilation hole 6 except the side opposing the edge 3e. The advantage of the liquid flow control according to the present invention can also be achieved when the single coating film 7 is used as shown in FIG. 7, since the wet-characteristic varied boundaries are formed by forming the coating film 7 from coating with a wet-characteristic different from the material composing the housing 3.

ADVANTAGE OF THE INVENTION

As described so far, the present invention provides an electric device wherein liquid penetration into a ventilation hole from its periphery can be prevented or reduced without sacrificing design and without limitation of the size and operation.

What is claimed is:

1. A computer device comprising:
   a device body with a keyboard disposed as input means;
   a display part for displaying an image corresponding to an operation for said device body,
   wherein a ventilation hole is formed in said device body; and
   wherein a liquid flow control arrangement in which a first region with a first wet-characteristic and a second region with a second wet-characteristic different from the wet-characteristic of said first region are alternately arranged is provided in said device body such that the arrangement surrounds a periphery of said ventilation hole.

2. An electric device comprising:
   a housing having an exposed surface portion outside and predetermined accommodation room inside; and
   electric and/or electronic parts accommodated in the accommodation room in said housing,
   wherein said housing comprises:
   a ventilation hole; and
   a liquid flow control arrangement formed on a periphery of said ventilation hole of said surface portion, in which arrangement a first region with a first wet-characteristic and a second region with a second wet-characteristic different from the wet-characteristic of said first region are alternately arranged.

3. The electric device according to claim 2, wherein said first region is composed of material similar to material composing said housing, and said second region is composed of material different from the material composing said housing.

4. The electric device according to claim 2, wherein said first region and said second region are composed of same material.

5. The electric device according to claim 4, wherein said first region and said second region are composed of material composing said housing, and said first region has surface roughness different from surface roughness of said second region.

6. The electric device according to claim 2, wherein said first region and second region have substantially same height level as said surface portion on the periphery.

7. A housing comprising:
   a housing body having predetermined accommodation room therein;
   a water-penetration-allowable flow path inevitably allowing water penetration into said accommodation room; and
   wet-characteristic varied boundaries formed in stripe form near to said water-penetration-allowable flow path, in which wet-characteristic is varied.

8. The housing according claim 7, wherein spacing between said wet-characteristic varied boundaries adjacent to each other is set in a range of 1 to 10 mm.

9. The housing according to claim 7, wherein a difference in angle of contact versus water between regions partitioned by said wet-characteristic varied boundaries is 50 degrees or more.

10. The housing according to claim 7, wherein said wet-characteristic varied boundaries are formed by arranging regions with different wet-characteristic adjacent to each other.

11. A cover composing an outer case of an electric device comprising:
    a cover body having a flat face with a predetermined area; and
    a wet-characteristic varied region formed in said flat face and composing substantially the same plane with said flat face, in which region wet-characteristic is intermittently varied.

12. The cover according to claim 11, wherein said wet-characteristic varied region is such that band regions composed of materials with angle of contact different to each other are arranged alternately.

13. The cover according to claim 11, wherein said wet-characteristic varied region has a first band region continuously having a first angle of contact for a predetermined width, and a second band region adjacent to said first band region and continuously having a second angle of contact different from the first angle of contact, for a predetermined width.

14. A device including:
    a housing;
    a ventilation hole operative formed in said housing; and
    bands of material to control liquid flowing into said ventilation hole alternatively disposed relative to said ventilation hole.

* * * * *